Nov. 13, 1962 E. J. BALS 3,063,644
ROTARY ATOMIZERS
Filed Dec. 2, 1960
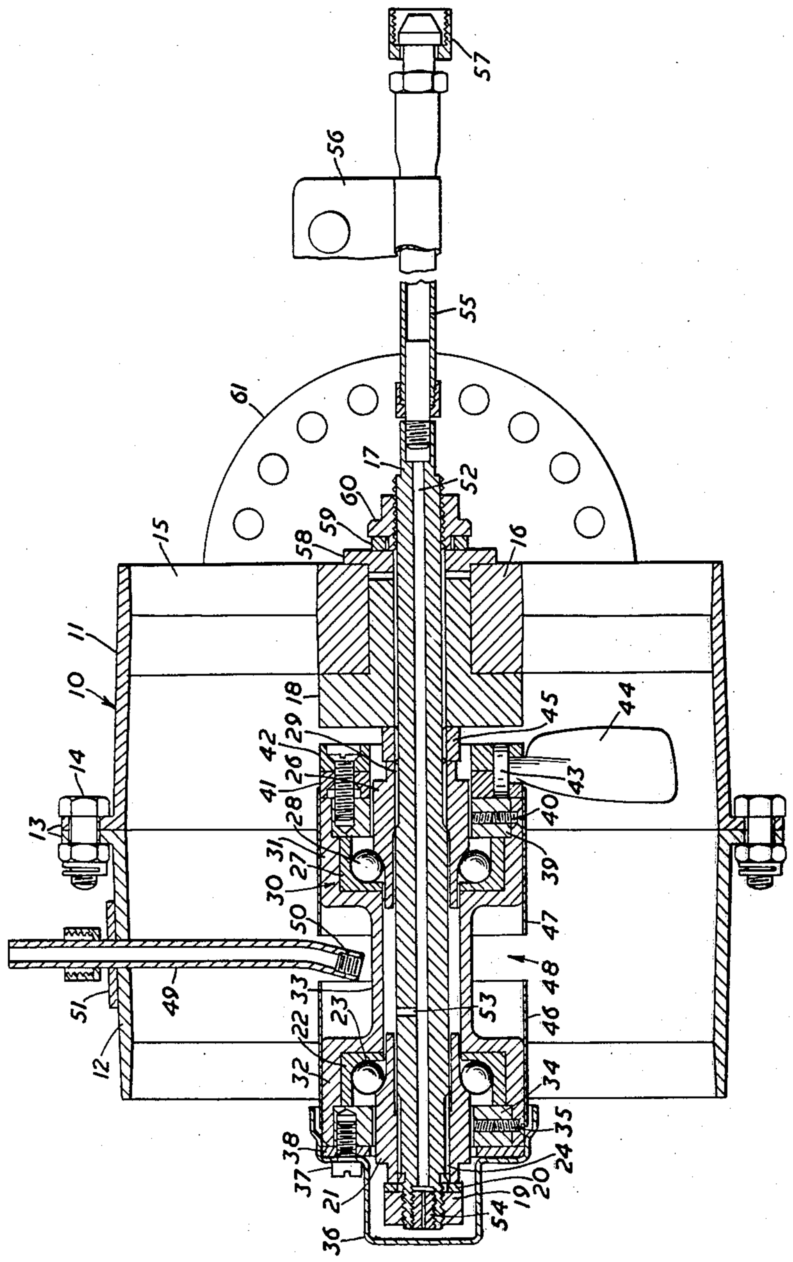
INVENTOR
EDWARD JULIUS BALS
BY
Watson, Cole, Grindle & Watson
ATTORNEY United States Patent Office 3,063,644

Patented Nov. 13, 1962

3,063,644
ROTARY ATOMIZERS

Edward Julius Bals, Pedmore, near Stourbridge, England, assignor to Birfield Engineering Limited, London, England Filed Dec. 2, 1960, Ser. No. 73,264
Claims priority, application Great Britain Dec. 4, 1959
11 Claims. (Cl. 239—77)

This invention relates to rotary atomizers, and in particular to rotary atomizers suitable for use in equipment for spraying growing crops, insect pests and the like.

Rotary atomizers have been developed comprising a rotatable gauze cylinder to the inner surface of which material to be sprayed is fed and from which it is emitted, as a result of centrifugal force, as an atomized mist. Such an atomizer has hitherto had the gauze cylinder mounted coaxially around one end of a shaft carried by a supporting bearing, the portion of the shaft overlapped by the axial length of the gauze cylinder being overhung from such bearing, and one object of the invention is to provide a rotary atomizer using a gauze atomizing cylinder without this overhang. A further object is to provide a rotary atomizer with cheap and reliable bearing means capable of satisfactory operation under adverse conditions.

According to the invention a rotary atomizer comprises a shaft, a bobbin-shaped hub having a central portion of less diameter than its end portions, the hub being rotatably mounted on the shaft by two spaced cup and cone ball bearings each of which is received within one of the end portions of the hub, a two-part gauze atomizing cylinder secured to the hub, each part being cylindrical and being secured to one of the end portions of the hub and extending part way across the central portion thereof to leave an axially extending gap between adjacent ends of the parts, and means to introduce liquid to be atomized into the cylinder through said gap.

Conveniently, the means for introducing the liquid into the cylinder is a supply pipe which extends through said gap. The atomizer may include driving means for the hub in the form of a windmill secured to one end portion of the hub. The shaft and the hub may be mounted within a duct so that the cylinder is coaxial with, and spaced from, the inner surface of the duct. In this case the windmill will also be within the duct which may have mounting plates secured thereto.

Preferably the shaft is hollow and one end thereof is arranged for connection to a source of lubricant under pressure, one or more apertures being provided in the shaft to allow the lubricant to reach the bearings. The other end of the shaft may be shrouded by a cap secured to one end of the hub. The supply pipe may pass through, and be secured, to the duct.

One embodiment of the invention will now be described by way of example with reference to the accompanying drawing which is a longitudinal cross-section through an atomizer embodying the invention.

Referring now to the drawing, the atomizer comprises a duct indicated generally at 10 and comprising two cylindrical parts 11 and 12 which are formed with mating flanges 13. Nut and bolt assemblies 14 are received in apertures in the flanges 13 to secure the parts 11 and 12 together. The part 11 is provided with a spider 15 which supports a bush 16 and a shaft 17 passes through a plug 18 received in the bush 16. At one end the shaft carries a nut 19, a washer 20 and the cone 21 of a cup and cone bearing the cup of which is indicated at 22 and the ball bearings of which are indicated at 23; the cone 21 is splined on to the shaft 17 at 24. The shaft 17 also carries a second cone 26 of a second cup and cone bearing the cup of which is indicated at 27 and the ball bearings of which are indicated at 28; the cone 26 is splined on to the shaft 17 at 29.

The cups 22 and 27 of the cup and cone bearings carry a bobbin-shaped hub 30 which has two end portions 31 and 32 and a central portion 33 of less diameter than the end portions; the cups 22 and 27 are received within cylindrical bores in the end portions 32 and 31 respectively of the hub. The cup and cone bearing at the left-hand, or free, end of the shaft 17 has its cup retained in position by a ring 34 which is secured by a plurality of circumferential screws 35 passing through the wall of the end portion 32 of the hub. A cap 36 surrounds the free end of the shaft and is secured to the ring 34 by means of screws 37 which are received in the ring; a washer 38 is interposed between the cap 36 and the ring 34.

The cup 27 of the right-hand bearing is retained in position by a ring 39 received in the end portion 31 of the hub. The ring 39 is retained in position by a plurality of screws 40 which pass through the wall of the end portion 31. Secured to the ring 39 is a split ring consisting of two ring elements 41 and 42 which are apertured to receive the bases 43 of aerofoil blades 44 which provide a windmill to rotate the hub 30. A spacing piece 45 is received between the cone 26 and the plug 18.

The hub 30 is provided with a two-part gauze atomizing cylinder, one part of which is indicated at 46 and the other part of which is indicated at 47. The part 46 is a close fit on the end part 32 of the hub 30 while the part 47 is a close fit on the end part 31 of the hub 30. The parts of the cylinder extend part way across the central portion 33 of the hub and leave an axially extending gap 48 between their adjacent ends. Through the gap 48 projects a liquid supply pipe 49 having a nozzle 50 at its inner end. The pipe 49 is secured to a plate 51 which in turn is secured to the part 12 of the duct.

The shaft 17 is provided with a central bore 52 for the supply of lubricant to the bearings, the lubricant being forced through a radial hole 53 in the shaft wall. The free end of the shaft is closed by a grub screw 54 which has a central aperture for the passage of lubricant. Secured to the right-hand end of the shaft is a pipe 55 having a supporting bracket 56 and being supplied with a union 57 for connection to a source of lubricant under pressure. The shaft is secured in position in the bush 16 by means of a spacer piece 58, a washer 59 and a nut 60. Mounting plates 61 are secured to the duct flanges 13 by means of the nut and bolt assemblies 14.

The operation of the atomizer is as follows: air is caused to flow through the duct 10 from right to left in the drawing and the air flow reacts on the windmill blades to cause rotation of the hub 30 with its associated atomizer cylinder 46, 47. The duct 10 is conveniently attached by a flexible conduit (not shown) to the output of a centrifugal fan (also not shown) and liquid to be atomized is supplied through the supply pipe 49 and enters the part 46 of the atomizer cylinder. It will be seen that the part 46 extends further across the central portion 33 of the hub than does the part 47. The end of the supply pipe 49 is angled so that the liquid is delivered into the part 46 which atomizes the liquid. The part 47 acts to prevent eddy currents and the like from affecting conditions within the part 46. The atomized liquid passes into the air stream flowing through the duct and an atomized mist of liquid passes out of the left-hand end of the duct.

If desired, the windmill blades 44 may be omitted and the atomizer driven from a shaft connected to a prime mover (again not shown).

The use of a bobbin-shaped hub with two spaced cup and cone ball bearings in accordance with the invention, and the positioning of the atomizing cylinder between these bearings, results in the production of a relatively cheap and reliable atomizer. Bearings of this type do not require very accurate adjustment and operate satisfactorily over long periods during service under adverse conditions in remote areas.

I claim:

1. A rotary atomizer comprising a shaft, a bobbin-shaped hub having a central portion of less diameter than its end portions, the hub being rotatably mounted on the shaft by two spaced cup and cone ball bearings one of which is adjustable and each of which is received within one of the end portions of the hub, a two-part gauze atomizing cylinder secured to the hub, each part being cylindrical and being secured to one of the end portions of the hub and extending part way across the central portion thereof to leave an axially extending gap between adjacent ends of the parts, and means to introduce liquid to be atomized into the cylinder through said gap between said cylinder parts.

2. A rotary atomizer comprising a shaft, a bobbin-shaped hub having a central portion of less diameter than the adjacent end portions, each of said end portions carrying an outwardly facing bearing track, a pair of opposed inwardly facing bearing cones mounted on said shaft and locked in adjusted position thereon, a ring of bearing balls between each cone and one of said outwardly facing bearing tracks, a two-part gauze atomizing cylinder secured to said hub, each part of said atomizing cylinder being cylindrical and secured to one of the end portions of said hub and extending part way across the central portion thereof to leave an axially extending gap between adjacent ends of said parts, and means to introduce liquid to be atomized into the cylinder through said gap between said cylinder parts.

3. An atomizer according to claim 2, wherein said means is a supply pipe which extends through said gap between said cylinder parts.

4. An atomizer according to claim 2, including driving means for the hub in the form of a windmill secured to one end portion of the hub.

5. A rotary atomizer comprising a shaft, a bobbin-shaped hub having a central portion of less diameter than the adjacent end portions, a pair of opposed, spaced, inwardly facing bearing cones mounted on said shaft for axial adjustment with respect thereto to permit the spacing of said cones to be varied, an outwardly facing bearing cup mounted in each of the end portions of said hub to correspond with one of said cones, a ring of bearing balls between each cone and the corresponding bearing cup, a two-part gauze atomizing cylinder secured to said hub, each part of said atomizing cylinder being cylindrical and secured to one of the end portions of said hub and extending part way across the central portion thereof to leave an axially extending gap between adjacent ends of said parts, and means to introduce liquid to be atomized into the cylinder through said gap between said cylinder parts.

6. An atomizer according to claim 5, wherein the shaft is hollow and one end thereof is arranged for connection to a source of lubricant under pressure, an aperture being provided in the shaft to allow lubricant to reach the bearings.

7. An atomizer according to claim 6, wherein the other end of the shaft is shrouded by a cap secured to one end of the hub.

8. A rotary atomizer comprising a duct, a shaft arranged within said duct substantially coaxially therewith, a bobbin-shaped hub having a central portion of less diameter than the adjacent end portions coaxial with and rotatable around said shaft, each of said end portions carrying an outwardly facing bearing track, a pair of opposed inwardly facing bearing cones mounted on said shaft, at least one of which is threaded on said shaft and locked in adjusted position thereon, a ring of bearing balls between each cone and the bearing track in the corresponding end portion of said hub, a two-part gauze atomizing cylinder secured to said hub, each part of said atomizing cylinder being cylindrical and secured to one of the end portions of said hub and extending part way across the central portion thereof to leave an axially extending gap between adjacent ends of said parts, and means to introduce liquid to be atomized into the cylinder through said gap between said cylinder parts.

9. A rotary atomizer according to claim 8, further comprising driving means in the form of a windmill secured to one of said end portions of the hub, said windmill being arranged within said duct.

10. A rotary atomizer comprising a hollow shaft, a bobbin-shaped hub having a central portion of less diameter than the adjacent end portions, a pair of opposed inwardly facing bearing cones mounted on said shaft with an adjustable spacing and locked in adjusted position thereon, each of said portions carrying an outwardly facing bearing track in cooperative relationship to one of said cones, a ring of bearing balls between each cone and the cooperating bearing track, the space between each of said cones and the cooperating bearing cup being in communication with the interior of said shaft, means for supplying lubricant to said shaft interior for the lubrication of the cup and cone bearings, a two-part gauze atomizing cylinder secured to said hub, each part of said atomizing cylinder being cylindrical and secured to one of the end portions of said hub and extending part way across the central portion thereof to leave an axially extending gap between adjacent ends of said parts, and means to introduce liquid to be atomized into the cylinder through said gap between said cylinder parts.

11. A rotary atomizer comprising a duct, a shaft arranged within said duct substantially coaxially therewith, a bobbin-shaped hub having a central portion of less diameter than the adjacent end portions coaxial with and rotatable around said shaft, each of said end portions carrying an outwardly facing bearing track, a pair of opposed inwardly facing bearing cones mounted on said shaft, at least one of which is threaded on said shaft and locked in adjusted position thereon, a ring of bearing balls between each cone and the bearing track in the corresponding end portion of said hub, a two-part gauze atomizing cylinder secured to said hub, each part of said atomizing cylinder being cylindrical and secured to one of the end portions of said hub and extending part way across the central portion thereof to leave an axially extending gap between adjacent ends of said parts, and a supply pipe attached to said duct and passing through said gap to introduce liquid to be atomized into the cylinder through said gap between said cylinder parts.

References Cited in the file of this patent

UNITED STATES PATENTS

| | | |
|---|---|---|
| 2,738,226 | Bals | Mar. 13, 1956 |
| 2,853,327 | Traugott | Sept. 23, 1958 |

FOREIGN PATENTS

| | | |
|---|---|---|
| 801,135 | Great Britain | Sept. 10, 1958 |